March 17, 1953  W. E. SAXE  2,631,596
WASHING APPARATUS FOR FRUITS, VEGETABLES, AND THE LIKE
Filed Oct. 17, 1947
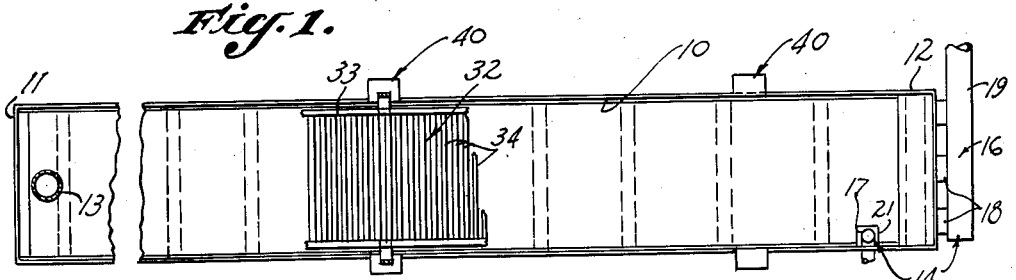
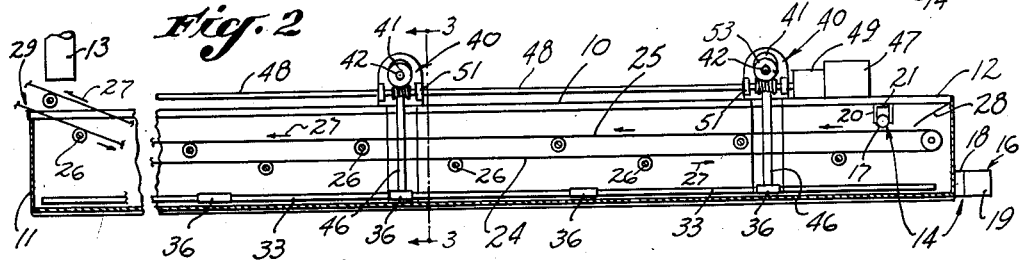
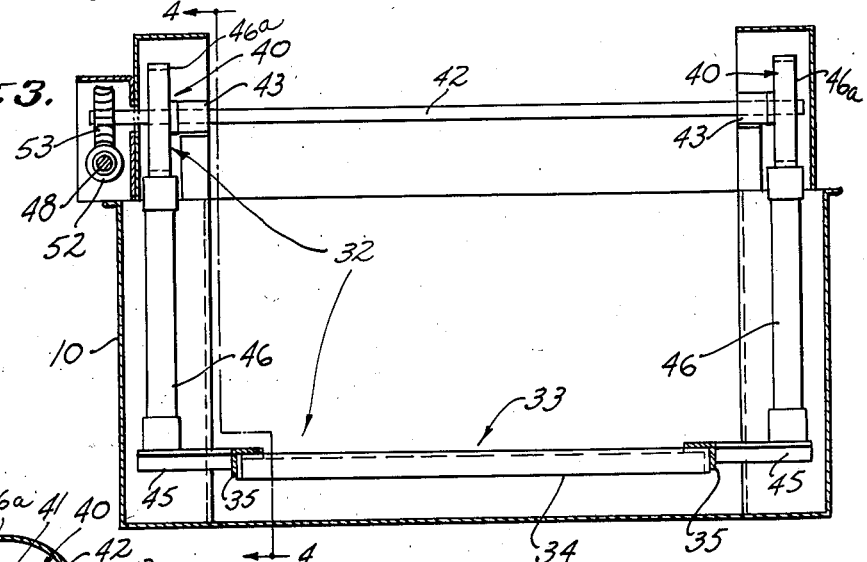
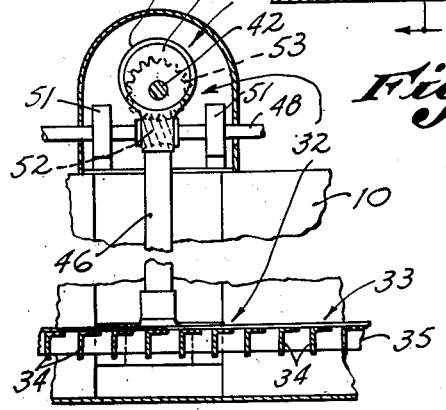
INVENTOR:
WALTER E. SAXE,
BY HIS ATTORNEYS
HARRIS, KIECH, FOSTER & HARRIS,
BY
Ward D. Foster Patented Mar. 17, 1953

2,631,596

UNITED STATES PATENT OFFICE 2,631,596

WASHING APPARATUS FOR FRUITS, VEGETABLES, AND THE LIKE

Walter E. Saxe, San Gabriel, Calif., assignor to The Conveyor Company, Los Angeles, Calif., a corporation of California Application October 17, 1947, Serial No. 780,419

2 Claims. (Cl. 134—104)

My invention relates in general to washing apparatus and, more particularly, to apparatus for removing dirt and other foreign matter adhering to or carried by articles which are to be cleaned. Since the fundamental principles of the invention are particularly applicable to and were originally embodied in an apparatus for washing such articles as root vegetables, e. g., carrots, I prefer to consider such an application herein for convenience in disclosing the invention. However, as will readily be apparent to those skilled in the art, the invention is susceptible to other applications and it will be understood that I do not intend to be limited to the particular application considered herein.

In general, my washing apparatus includes a reservoir or tank which is adapted to contain a cleansing liquid such as water, and includes means within the tank for removing dirt and other foreign matter which may adhere to or be carried by the articles which are to be washed, a primary object of the invention being to provide improved means for disposing of the foreign matter removed from the articles.

More specifically, a primary object of the present invention is to provide a washing apparatus having means for continuously agitating and propelling toward an outlet in the tank any foreign matter which has been removed from the articles being washed so that such foreign matter does not accumulate in the tank.

Another object of my invention is to provide a washing apparatus which includes an agitator disposed within the tank, and which includes means for oscillating the agitator in such a manner that it continuously stirs any foreign matter tending to settle to the bottom of the tank to keep it suspended in the water or other liquid, the oscillating means being adapted to oscillate the agitator in such a manner that it propels the foreign matter toward the outlet in the tank.

A further object is to provide eccentric means for oscillating the agitator in such a manner that it periodically moves toward the outlet in close proximity to the bottom of the tank so as to move any foreign matter tending to settle to the bottom of the tank toward the outlet.

An important object of the invention is to provide an apparatus of the character described wherein the washing means comprises conveyor means for continuously moving the articles to be washed from the outlet of the tank toward an inlet thereof beneath the surface of the water or other liquid in the tank and in a direction opposite to the direction of flow of water through the tank. This arrangement provides that the articles being washed will encounter progressively cleaner water as they move through the tank, which is an important feature of the invention.

Another object of the invention is to provide a washing apparatus of the foregoing general character having means for continuously flowing water or other cleansing liquids through the tank from the inlet to the outlet thereof while maintaining the level of the water in the tank substantially constant. Another object in this connection is to provide an apparatus wherein the outlet includes separate first and second outlets, the first outlet being located adjacent the bottom of the tank and having a flow capacity which is less than that of the inlet, and the second outlet being located above the first outlet and having a flow capacity such that the combined flow capacity of the first and second outlet is at least equal to the flow capacity of the inlet. Thus, part of the water flowing through the tank will escape through the first outlet and the remainder will escape through the second outlet, thereby maintaining the water level substantially constant at the level of the second outlet, which is an important feature of the invention.

The foregoing objects of my invention and the advantages suggested thereby, together with various other objects and advantages which will be evident hereinafter, may be attained through the utilization of the exemplary embodiment which is illustrated in the accompanying drawing and which is described in detail hereinafter. Referring to the drawing, which is intended as illustrative only:

Fig. 1 is a plan view of a washing apparatus which embodies the invention, a conveyor means forming part of the apparatus having been removed to reveal the remaining components of the apparatus more clearly;

Fig. 2 is a side elevational view of the apparatus with the conveyor means in place, one side wall of the tank forming part of the apparatus having been removed to reveal the remaining components thereof;

Fig. 3 is an enlarged, sectional view which is taken along the broken line 3—3 of Fig. 2; and Fig. 4 is a fragmentary, sectional view taken along the broken line 4—4 of Fig. 3.

Referring to the drawing, I show a washing apparatus which includes an elongated reservoir or tank 10 having an inlet end 11 and an outlet end 12, the tank being provided with an inlet 13 for a cleansing liquid such as water at its inlet end, and being provided with an outlet 14 at its outlet end. Thus, water introduced into the tank 10 through the inlet 13 flows through the tank from the inlet end to the outlet end thereof and escapes through the outlet 14, water being introduced into the tank through the inlet 13 continuously so that continuous flow of water through the tank exists.

The outlet 14 is formed in two parts, viz., a first or main outlet 16 and a second or overflow outlet 17, the main outlet comprising a plurality of pipes 18 connected to a common outlet pipe or manifold 19, and the overflow outlet 17 comprising a pipe having a vertical arm 20 which terminates in an open upper end 21 located within the tank 10 at a predetermined level. The main outlet 16 is located adjacent the bottom of the tank 10 and the pipes 18 thereof are of a size such that the flow capacity of the main outlet is less than the flow capacity of the inlet 13 so that only a part of the water introduced into the tank through the inlet may escape through the main outlet. The overflow outlet 17 is of a size such that the combined flow capacity of the main and overflow outlets is somewhat greater than the flow capacity of the inlet 13 so that any water which cannot escape through the main outlet may escape through the overflow outlet. It will be apparent that, with this construction, the water level in the tank 10 will be maintained substantially constant at the level of the open upper end 21 of the overflow outlet 17. Although the flow through the main and overflow outlets 16 and 17 may be divided as desired, I have found that it is advantageous to provide the main outlet with a flow capacity of, for example, 75% of the flow capacity of the inlet 13 so that approximately 75% of the water introduced into the tank 10 will escape through the main outlet, the remaining 25% escaping through the overflow outlet. However, the foregoing values are merely intended as illustrative and it will be understood that I do not intend to be limited thereto.

Disposed within the tank 10 below the level of the overflow outlet 17, i. e., below the water level in the tank, is a conveyor means 24 for transporting root vegetables or other articles to be washed through the water in the tank from the outlet end 12 of the tank toward the inlet end 11 thereof so that the articles being washed move in a direction opposite to the direction of flow of the water through the tank. In the construction illustrated, the conveyor means 24 comprises an endless conveyor belt 25, preferably formed of wire screen or other perforated material, which is supported by rollers 26, the conveyor belt being driven in the direction of the arrows 27 by any suitable means (not shown), such as an electric motor, for example. Thus, in order to remove dirt or other foreign material adhering to or carried by the vegetables or other articles to be washed, it is merely necessary to dump the vegetables onto the conveyor belt 25 at the outlet end 12 of the tank 10, whereupon the belt carries the vegetables toward the inlet end 11 of the tank against the flow of water through the tank so that the water washes the dirt and other foreign matter from the vegetables, circulation of water around the vegetables being permitted by the perforations in the conveyor belt. In order to facilitate placing the vegetables or other articles on the conveyor belt 25, the tank 10 is preferably provided with an inclined ramp 28 at the outlet end 12 of the tank on which the articles may be dumped and down which they will slide or roll onto the belt. The articles may be removed from the tank 10 after they have been washed by providing the conveyor means 24 with an upwardly inclined portion 29 at the inlet end 11 of the tank which carries the articles upwardly out of the tank.

It will be apparent that by providing a construction which utilizes countercurrent flow of the water and the articles being washed, the articles encounter progressively cleaner water as they move through the tank 10 from the outlet end 12 thereof toward the inlet end 11. Thus, by the time the articles being washed reach the inlet end 11 of the tank 10, they are being bathed in substantially clean water from the inlet 13 so that substantially all of the dirt and other foreign matter which may have been carried thereby will have been washed therefrom.

When utilizing my invention for washing root vegetables in particular, substantially all of the foreign matter carried by the vegetables will be dirt which, when washed therefrom by movement of the vegetables through the tank 10 in the manner previously discussed, tends to settle to the bottom of the tank in the form of mud. In order to avoid accumulations of mud or other foreign matter which would tend to fill the tank 10, I provide means, indicated generally by the numeral 32, for continuously agitating the mud so as to maintain it in a more or less fluid condition and for propelling the mud toward the main outlet 16 so that it will be carried from the tank by the water flowing through the main outlet, which is an important feature of the invention.

As best shown in Figs. 3 and 4 of the drawings, the agitating means 32 includes an agitator 33 which is disposed within the tank 10 adjacent the bottom thereof and which includes a plurality of generally vertical transverse paddles 34 for stirring up any foreign matter which tends to settle to the bottom of the tank and for propelling it toward the main outlet 16. In the particular construction illustrated, the paddles 34 consist of angle members which are suitably secured, as by welding, for example, to longitudinal angle members 35. For convenience in manufacturing the agitator 33, it is preferably formed in several sections which may be suitably secured together, as by clamps 36.

The agitating means 32 includes eccentric means, indicated generally by the numeral 40, for oscillating the agitator 33 in such a manner that it periodically moves toward the main outlet 16 in the tank with the lower edges of the paddles 34 in close proximity to the bottom of the tank 10 so as to stir up any mud which may have settled to the bottom of the tank and propel it toward the main outlet, whereby it will be carried out of the tank by the water escaping through the main outlet. More specifically, the eccentric means 40 is adapted to oscillate the agitator 33 in such a manner that each point on the agitator moves in a circular path in a vertical plane in a direction such that each point on the agitator moves toward the main outlet 16 as it moves along the lowermost portion of its circular path.

Referring particularly to Figs. 3 and 4 of the drawing, the eccentric means 40 includes a plurality of cylindrical eccentrics 41 which are mounted on horizontal shafts 42 located above and extending transversely of the tank 10, each shaft being journaled in suitable bearings 43 mounted on the tank. Each eccentric 41 is operatively connected to an arm 45 of the agitator 33 by a bar or rod 46 having a ring or eye 46a at its upper end which encircles the eccentric. Thus, upon rotation of the shafts 42, the eccentrics 41, acting through the connecting rods 46, oscillate the agitator 33 in such a manner that each point thereon describes a circle in a vertical plane, the direction of rotation of the shafts 42 being such that the paddles 34 move toward the main outlet 16 at their closest approach to the bottom of the tank 10, thereby propelling any mud lying on the bottom of the tank toward the main outlet so that it may be carried away by the water escaping therethrough.

The shafts 42 are driven by an electric motor 47 in the particular construction illustrated, the motor being connected to a shaft 48, which extends longitudinally of the tank 10, through a reduction gear unit 49. The longitudinal shaft 48 is journaled in bearings 51 which are carried by the tank 10, and has fixed thereon gears 52 which mesh with gears 53 fixed on the shafts 42 so as to rotate the shafts 42 to oscillate the agitator 33 in the manner previously described.

It will thus be apparent that my invention provides a washing apparatus which continuously disposes of the foreign matter removed from the articles being washed by agitating any of the foreign matter which tends to settle to the bottom of the tank 10 so as to maintain it in a more or less fluid condition, and by propelling the foreign matter adjacent the bottom of the tank toward the main outlet 16, with the result that the foreign matter washed from the articles being cleaned is carried out of the tank by water escaping through the main outlet as fast as it is removed from the articles. Consequently, since the agitating means 32 prevents the foreign matter from accumulating, the apparatus may be operated continuously with no necessity for shutdowns to remove mud or other foreign matter from the tank, which is an important feature of the invention.

Although I have disclosed an exemplary embodiment of my invention and have discussed one possible application thereof for convenience in disclosing same, it will be understood that the invention is susceptible to other applications and that various changes, modifications and substitutions may be incorporated in the specific embodiment disclosed, all without necessarily departing from the spirit of the invention.

Consequently, I hereby reserve the right to all such changes, modifications and substitutions as properly come within the scope of the invention as set forth in the appended claims.

I claim as my invention:

1. In an apparatus for washing from such articles as root vegetables materials such as dirt which settle in water to form mud, the combination of: a tank having an inlet and an outlet respectively located at opposite sides thereof; means for flowing water through said tank from said inlet to said outlet; a conveyor in said tank for conveying the articles to be washed through said tank in a direction from said outlet toward said inlet so as to provide concurrent movement of the articles and the water through said tank, said outlet including a main outlet adjacent the bottom of said tank and having a flow capacity less than the flow capacity of said inlet, and including an auxiliary, overflow outlet above the level of said conveyor; means for driving said conveyor; an agitator disposed within said tank adjacent the bottom thereof and having a plurality of spaced, substantially parallel, generally vertical paddles extending transversely of the direction of movement of the articles through said tank by said conveyor and the direction of flow of the water through said tank; actuating means operatively connected to said agitator for moving said agitator in a circular orbit in a vertical plane and in the counterclockwise direction when the apparatus is viewed from a position such that said inlet is on the observer's left, so as to move said paddles in similar circular orbits, whereby each paddle moves toward said outlet as it moves along the lowermost poriton of its orbit, whereby said paddles propel any mud resulting from washing of the articles on said conveyor toward said outlet with a raking action; and means for driving said actuating means.

2. An apparatus as defined in claim 1 wherein said actuating means includes: a horizontal shaft extending generally parallel to said paddles and above said tank; a pair of eccentrics respectively located at opposite ends of said shaft; a collar encircling each of said eccentrics; and means connecting said collars to said agitator so that rotation of said eccentrics by said shaft produces said orbital movement of said agitator.

WALTER E. SAXE.

REFERENCES CITED

The following references are of record in the file of this patent:

UNITED STATES PATENTS

| Number | Name | Date |
|---|---|---|
| 354,245 | Sargent et al. | Dec. 14, 1886 |
| 413,698 | White | Oct. 29, 1889 |
| 627,612 | Fischer et al. | June 27, 1899 |
| 784,622 | Lindemann et al. | Mar. 14, 1905 |
| 952,734 | Haller | Mar. 22, 1910 |
| 1,354,676 | Mitchell | Oct. 5, 1920 |
| 1,465,085 | Macabee | Aug. 14, 1923 |
| 1,719,332 | Kennedy | July 2, 1929 |
| 1,918,742 | Elrod | July 18, 1933 |
| 2,163,977 | Ferry | June 27, 1939 |
| 2,191,744 | Scott | Feb. 27, 1940 |